(12) United States Patent
Na et al.

(10) Patent No.: US 8,358,670 B2
(45) Date of Patent: Jan. 22, 2013

(54) METHOD AND APPARATUS FOR PROCESSING PACKET

(75) Inventors: Il-ju Na, Yongin-si (KR); Suk-jin Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 12/648,432

(22) Filed: Dec. 29, 2009

(65) Prior Publication Data

US 2010/0166017 A1    Jul. 1, 2010

Related U.S. Application Data

(60) Provisional application No. 61/141,327, filed on Dec. 30, 2008.

(30) Foreign Application Priority Data

Sep. 18, 2009    (KR) .................. 10-2009-0088430

(51) Int. Cl.
*H04J 3/24* (2006.01)
(52) U.S. Cl. .................................................. 370/474
(58) Field of Classification Search .......... 370/328–339, 370/389, 392–394, 395.5–395.52, 464–474
See application file for complete search history.

(56) References Cited

U.S. PATENT DOCUMENTS

| 7,730,200 B2* | 6/2010 | Beers et al. ............... 709/231 |
| 2005/0058078 A1 | 3/2005 | Jung et al. |
| 2006/0168270 A1 | 7/2006 | Townsley et al. |
| 2008/0037540 A1 | 2/2008 | Ngo et al. |
| 2008/0291324 A1* | 11/2008 | Hong et al. ............... 348/484 |
| 2009/0327544 A1* | 12/2009 | Cho et al. ............... 710/105 |
| 2010/0136987 A1 | 6/2010 | Kim et al. |

FOREIGN PATENT DOCUMENTS

| KR | 1020050008440 A | 1/2005 |
| KR | 1020060131671 A | 12/2006 |
| KR | 1020080044321 A | 5/2008 |

OTHER PUBLICATIONS

Wireless HD, WirelessHD Specification Version 1.0 Overview, 77 pages, Oct. 2007.*
International Search Report dated Aug. 6, 2010 issued in counterpart PCT international Application No. PCT/KR2009/007849.

* cited by examiner

*Primary Examiner* — Frank Duong
(74) *Attorney, Agent, or Firm* — Sughrue Mion, PLLC

(57) ABSTRACT

Provided is a packet processing apparatus and method for audio/video (AV) data transmission, in which a simple protocol optimized for AV data transmission is used. Information distinguishing a data packet from a control packet may be included in a data link layer packet header, so that a data packet and a control packet may be distinguished from each other and thereby may be processed according to different procedures.

25 Claims, 9 Drawing Sheets

AV TRANSMITTING APPARATUS    AV DATA    AV RECEIVING APPARATUS

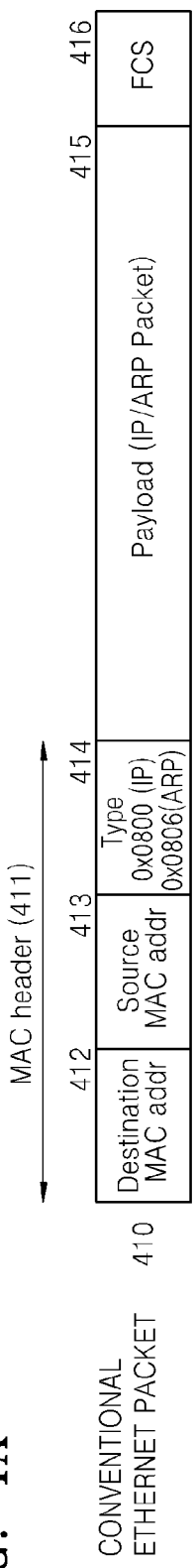
FIG. 4A CONVENTIONAL ETHERNET PACKET
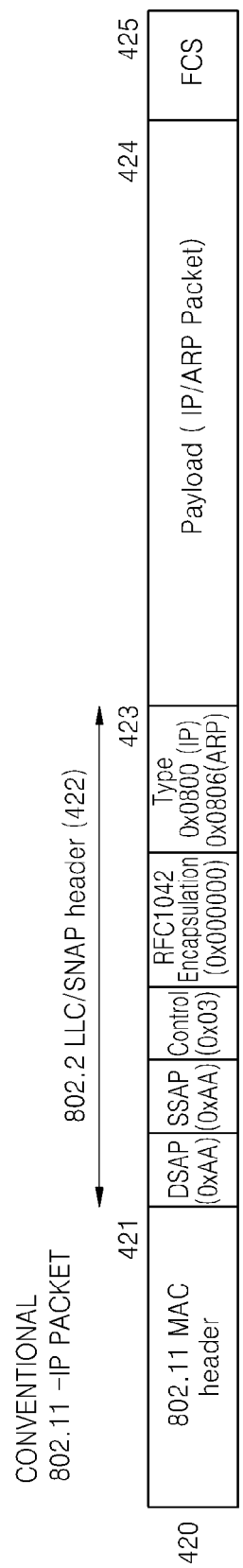
FIG. 4B CONVENTIONAL 802.11 –IP PACKET
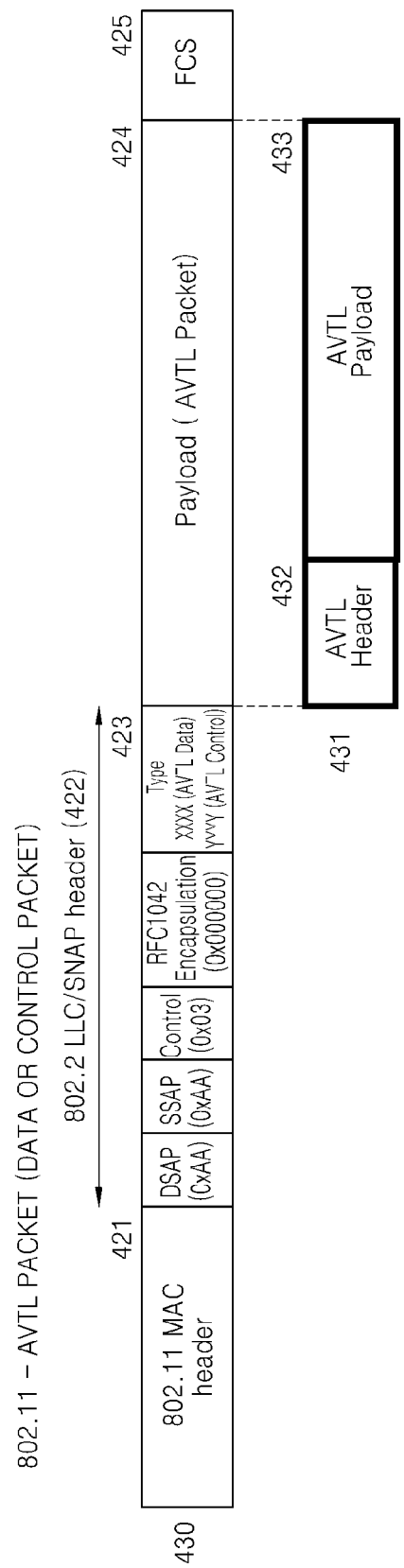
FIG. 4C 802.11 – AVTL PACKET (DATA OR CONTROL PACKET)

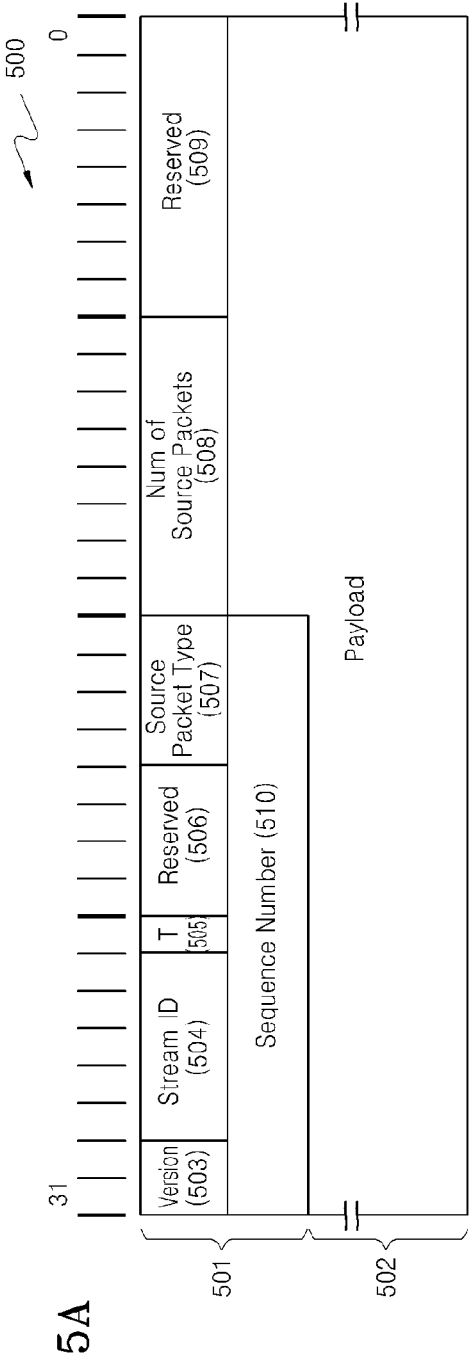

| Field Name | Size (bits) | Meaning |
|---|---|---|
| Version | 2 | Version of AVTL data packet |
| Stream ID | 5 | ID of AV stream |
| Time Stamp Flag (T) | 1 | 1= insert time stamp having 4-byte length in front of each source packet<br>0= no time stamps are added |
| Reserved | 4 | |
| Source Packet Type | 4 | 0= MPEG2-TS packet (188-byte length)<br>1~15 = reserved (it is possible to add any other type of stream) |
| Num of Source Packets | 8 | The number of source packets included in payload of AVTL data packet |
| Reserved | 8 | |
| Sequence Number | 16 | Number that increments by 1 every time AVTL data packet is transmitted |
| Payload | variable | Source packets and time stamps |

FIG. 7A

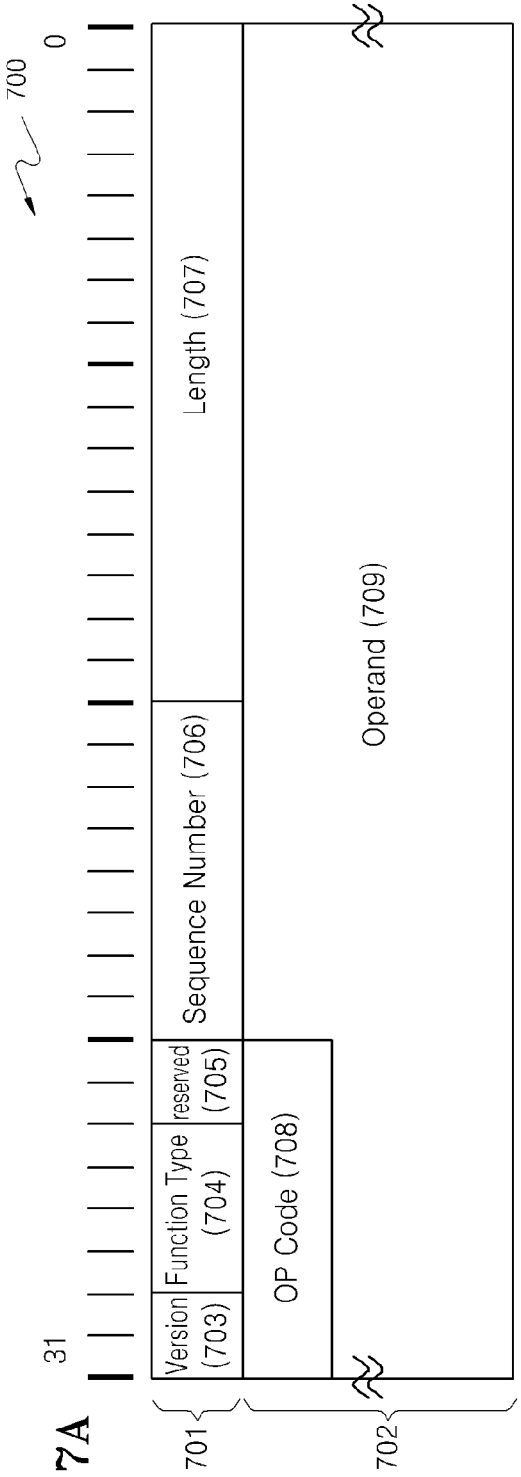

FIG. 7B

| Field Name | Size (bits) | Meaning |
| --- | --- | --- |
| Version | 2 | VERSION OF ATVL CONTROL PACKET |
| Function Type | 4 | 0= CP control<br>1= AV capability exchange<br>2= connection management<br>3= device control (optional)<br>4~15= reserved |
| Reserved | 2 | |
| Sequence Number | 8 | Number that increments by 1 every time AVTL control packet is transmitted |
| Length | 16 | Length of payload in bytes |
| OP Code | 8 | Type of AVTL control message |
| Operand | variable | AVTL control message determined by op code value |

FIG. 8

*S = AV Source, D = AV Destination

| Function Type | OP Code | Name | S | D |
|---|---|---|---|---|
| Content Protection Control (0x0) | 0x00 | CP_CONTROL_COMMAND | O | O |
| | 0x80 | CP_CONTROL_RESPONSE | O | O |

| Function Type | OP Code | Name | S | D |
|---|---|---|---|---|
| AV Capability Exchange (0x1) | 0x00 | AV_PROBE_REQUEST | O | O |
| | 0x80 | AV_PROBE_RESPONSE | O | O |
| | 0x01 | AV_ANNOUNCE_NOTIFY | O | O |

| Function Type | OP Code | Name | S | D |
|---|---|---|---|---|
| Connection Management (0x2) | 0x00 | CONNECTION_SETUP_REQUEST | O | O |
| | 0x80 | CONNECTION_SETUP_RESPONSE | O | O |
| | 0x01 | CONNECTION_BREAK_NOTIFY | O | O |
| | 0x02 | STREAM_START_NOTIFY | O | |
| | 0x03 | ERROR_FEEDBACK_NOTIFY | | O |
| | 0x04 | AV_ADAPTATION_REQUEST | | O |
| | 0x84 | AV_ADAPTATION_RESPONSE | O | |

METHOD AND APPARATUS FOR PROCESSING PACKET

CROSS-REFERENCE TO RELATED PATENT APPLICATION

This application claims priority from U.S. Provisional Patent Application No. 61/141,327, filed on Dec. 30, 2008, in the U.S. Patent and Trademark Office, and priority from Korean Patent Application No. 10-2009-0088430, filed on Sep. 18, 2009, in the Korean Intellectual Property Office, the disclosures of which are incorporated herein in their entirety by reference.

BACKGROUND

1. Field

Exemplary embodiments relate to a method and apparatus for processing packets, and more particularly, to a method and apparatus for processing packets, by which a data packet and a control packet can be distinguished from each other and processed according to separate procedures.

2. Description of the Related Art

With recent rapid progress in computer, electronic, and communication technologies, a technique in which an audio/video (AV) transmitting apparatus, such as a computer, a game player, or a set-top box, transmits AV data wirelessly to an AV receiving apparatus such as a TV or a monitor has been developed, as illustrated in FIG. 1. In particular, techniques for wirelessly transmitting high-quality AV data with a large amount of data, such as H.264, are being developed.

Some amount of latency in data processing inevitably occurs during AV data transmission. AV data that users do not or minimally interact with, such as AV data in movies, is not greatly affected by the increased latency, whereas AV data that users frequently interact with, such as AV data in video games, is greatly affected by latency. In other words, when latency increases, there is a greater delay between a user's input and a response in the AV data, which may be unacceptable to users.

Therefore, a technique of transmitting high-quality AV data with low latency may be required.

SUMMARY

According to an aspect of an exemplary embodiment, there is provided a packet producing method including determining whether information to be transmitted is data or control information; generating a data link layer packet header including information used to distinguish a data packet from a control packet, according to a result of the determination; and encapsulating the information to be transmitted by using the data link layer packet header.

According to another aspect of an exemplary embodiment, there is provided a packet processing method including determining whether an upper layer packet included in a payload of a data link layer packet is a data packet or a control packet, by analyzing a header of the data link layer packet; and processing the upper layer packet according to separate procedures according to a result of the determining.

The packet processing method may further include, if the upper layer packet is a data packet, processing the data packet using hardware; and if the upper layer packet is a control packet, processing the control packet using software.

According to another exemplary embodiment, there is provided a packet producing apparatus including a determination unit for determining whether information to be transmitted is data or control information; a header generation unit for generating a data link layer packet header including information used to distinguish a data packet from a control packet according to a result of the determination; and an encapsulation unit for encapsulating the information to be transmitted by using the data link layer packet header.

According to another aspect exemplary embodiment, there is provided a packet processing apparatus including a determination unit for determining whether an upper layer packet included in a payload of a data link layer packet is a data packet or a control packet, by analyzing a header of the data link layer packet; and a processing unit for processing the data packet and the control packet according to separate procedures according to a result of the determining.

If the upper layer packet is a data packet, the processing unit may process the data packet using hardware. If the upper layer packet is a control packet, the processing unit may process the control packet using software.

According to another aspect of an exemplary embodiment, there is provided a packet transmission system including a transmitter for transmitting a data link layer packet that includes information distinguishing a data packet from a control packet in a header of the data link layer packet; and a receiver for receiving the data link layer packet, for determining whether an upper layer packet included in a payload of the data link layer packet is a data packet or a control packet, by analyzing the header of the data link layer packet, and for processing the upper layer packet according to different procedures according to a result of the determining.

According to another aspect of an exemplary embodiment, there is provided a data link layer packet including a data link layer packet header including information used to distinguish a data packet from a control packet; and a data link layer packet payload.

According to another aspect of an exemplary embodiment, there is provided a computer readable recording medium having recorded thereon a computer program for executing the packet producing method or the packet processing method.

BRIEF DESCRIPTION OF THE DRAWINGS

The above and other features and aspects will become more apparent by describing in detail exemplary embodiments thereof with reference to the attached drawings in which:

FIGS. 4A to 4C show a comparison between conventional data link layer packets and a data link layer packet according to an exemplary embodiment;

FIGS. 5A and 5B show an AV Transport Layer (AVTL) data packet according to an exemplary embodiment;

FIGS. 7A and 7B show an AVTL control packet according to an exemplary embodiment;

FIG. 8 is a table showing exemplary AVTL control messages included in a payload of the AVTL control packet illustrated in FIG. 7;

DETAILED DESCRIPTION OF EXEMPLARY EMBODIMENTS

Figure 1:
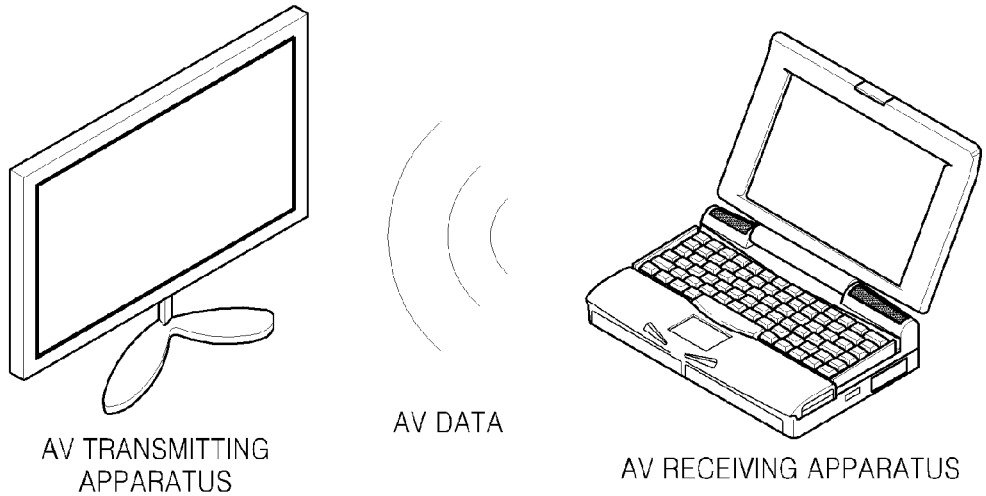
FIG. 1 illustrates wireless transmission of audio/video (AV) data from an AV transmission apparatus to an AV reception apparatus.

Exemplary embodiments will now be explained with reference to the accompanying drawings to provide a thorough understanding. Well-known or conventional details may not be described in order not to unnecessarily obscure aspects of exemplary embodiments in detail. It will be further understood that the terms "comprises", "comprising", "includes", and "including", when used in this specification, specify the presence of stated features, regions, integers, steps, operations, elements, components, and/or groups, but do not preclude the presence or addition of one or more other features, regions, integers, steps, operations, elements, components, and/or groups.

Like reference numbers are allocated to like elements. Like elements may be representatively explained only in a first exemplary embodiment and may be omitted in subsequent exemplary embodiments. In the drawings, scale and thicknesses of elements may be exaggerated for clarity.

Figure 2:
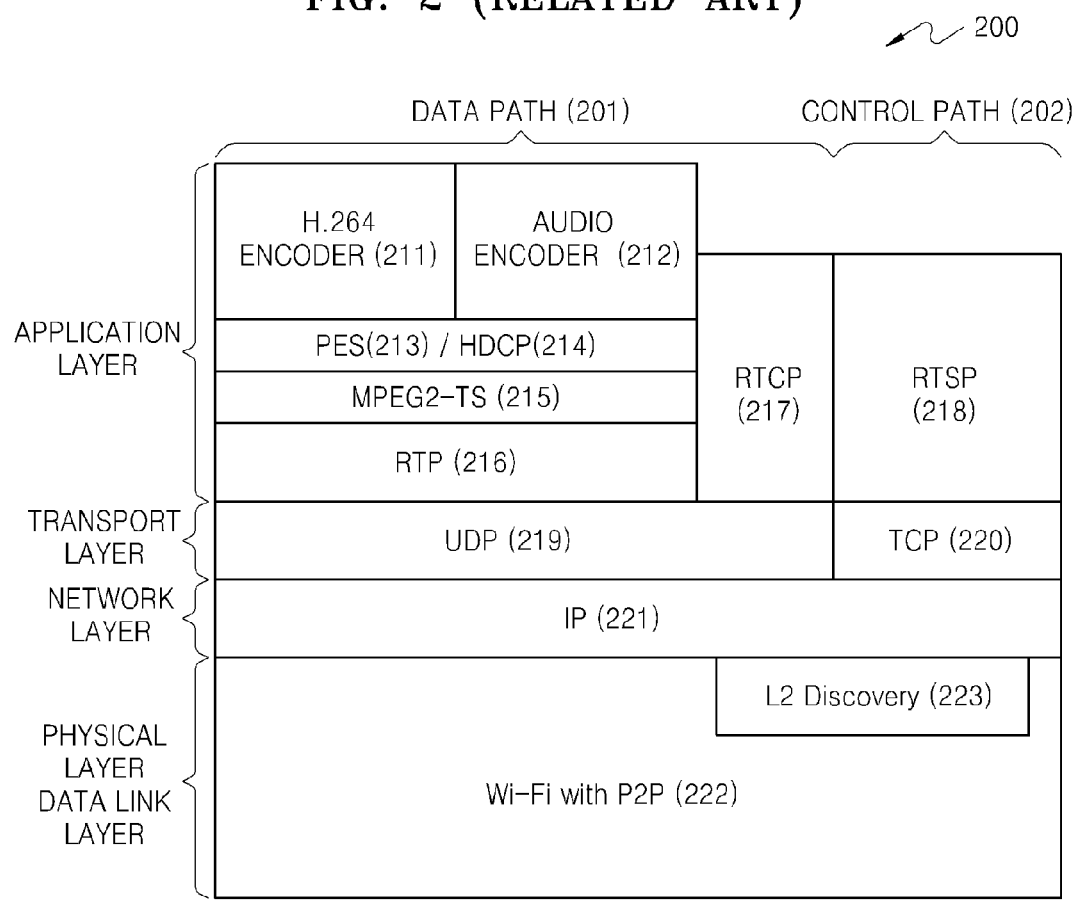
FIG. 2 shows a protocol stack for transmitting AV data using Internet Protocols (IPs) based on a conventional Real-time Transport Protocol (RTP)/Real Time Streaming Protocol (RTSP)

FIG. 2 shows a protocol stack 200 for transmitting audio/video (AV) data using conventional Real-time Transport Protocol (RTP)/Real Time Streaming Protocol (RTSP)-based Internet Protocols (IPs).

Referring to FIG. 2, an H.264 encoder 211 encodes video data into a video data elementary stream (ES), and an audio encoder 212 encodes audio data into an audio data ES. A Packetized Elementary Stream (PES) 213 encapsulates the video data ES and the audio data ES into a PES packet header to produce PES packets. Digital copyright protection for the AV data may be provided by High-bandwidth Digital Content Protection (HDCP) 214. An MPEG2-Transport Stream (TS) 215 encapsulates the PES packets to multiplex a plurality of video or audio data pieces into TS packets.

The TS packets may be transmitted to a data link layer via, for example, the following IP-based protocols: an RTP 216, an RTP Control Protocol (RTCP) 217, and an RTSP 218, which are in an application layer; a User Datagram Protocol (UDP) 219 and a Transmission Control Protocol (TCP) 220, which are in a transport layer; and an IP 221 included in a network layer. A Wi-Fi with Peer to Peer (P2P) 222 is an IEEE 802.11-based P2P protocol under development by the Wi-Fi Alliance and specifies a physical layer and the data link layer. The Wi-Fi with P2P 222 enables device to device communication and includes second layer (L2) discovery 223, P2P group formation & management (not shown), etc. The protocols listed above are not described herein in detail, in order not to obscure aspects of exemplary embodiments.

During transmission of AV data using the Internet Protocols listed above, a data path in which AV data is transmitted and a control path in which control information is transmitted are not distinguished from each other. However, a portion indicated by a reference numeral 201 may in general be considered as the data path, and a portion indicated by a reference numeral 202 may in general be considered as the control path.

The Internet Protocols are not optimal for AV data wirelessly transmitted a short distance in a P2P way, such as when a movie is being watched or when a video game is being played at home. Accordingly, AV data transmission may be unnecessarily complex, and a data processing procedure may be greatly delayed. In addition, Internet Protocols were developed on the assumption that they are to be used by software, and thus it is difficult to implement them into hardware in order to increase the speed at which high-quality AV data may be processed.

Figure 3:
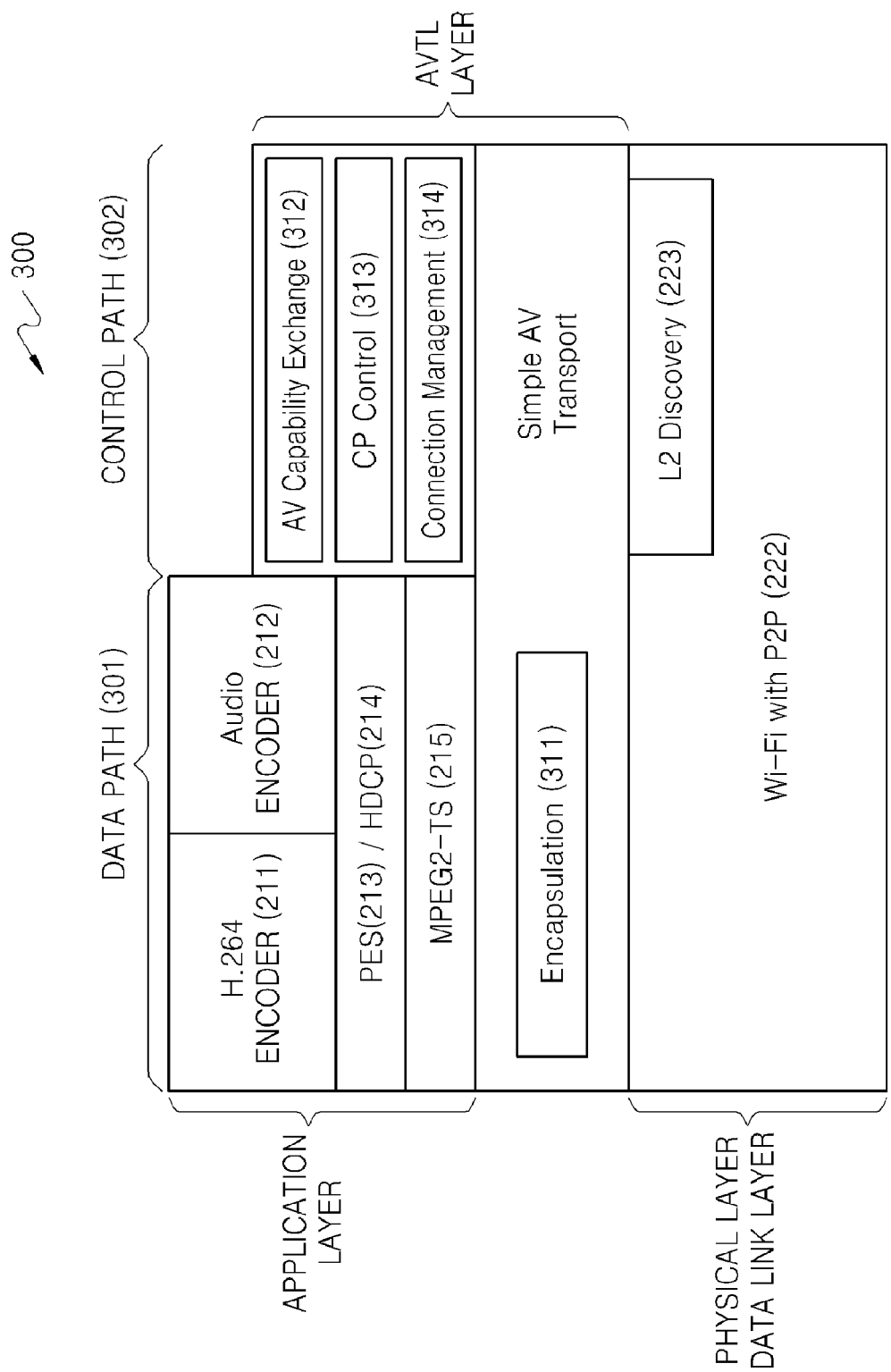
FIG. 3 shows a protocol stack for transmitting AV data, according to an exemplary.

FIG. 3 shows a protocol stack 300 for transmitting AV data, according to an exemplary embodiment.

Referring to FIG. 3, the protocol stack 300 according to the present exemplary embodiment may define simple AV transmission protocols optimized for wireless AV data transmission, instead of conventional Internet Protocols such as an RTP, an RTCP, an RTSP, a UDP, a TCP, an IP, etc. Therefore, high-quality AV data may be processed more efficiently when compared to conventional Internet Protocols.

An AV transmission protocol according to the current exemplary embodiment may include protocols such as a data encapsulation 311, an AV capability exchange 312, a Contents Protection (CP) control 313, and a connection management 314, but is not limited thereto. A layer including these protocols may be referred to as an AV Transport Layer (AVTL).

The data encapsulation 311 may encapsulate data to be transmitted into an AVTL packet and may provide various functions such as time stamps and source packet aggregation. Accordingly, the data encapsulation 311 may replace a conventional RTP.

The AV capability exchange 312 may allow a transmission side AV apparatus and a reception side AV apparatus to exchange information regarding their counterpart's AV capabilities. Accordingly, the AV capability exchange 312 may replace a conventional Session Announcement Protocol (SAP)/RTSP, a Session Description Protocol (SDP)/Extended Display Identification Data (EDID), and other AV capability related protocols. The CP control 313 is a protocol that may transmit a message associated with content protection, such as an encryption, decryption, or authentication message. The connection management 314 is a protocol that may provide connection setup, connection break, error feedback, connection adaptation, and other connection management information and commands. The connection management 314 may replace conventional RTSP and RTCP.

According to the exemplary embodiment, an upper layer may be divided into a data path 301 in which AV data, such as an MPEG2 TS, is transmitted, and a control path 302 in which control information such as a control command or a response message is transmitted, by using a field of a data link layer. Exemplary embodiments will now be explained with reference to FIGS. 4 through 8.

FIG. 4A through 4C show a comparison between conventional data link layer packets and a data link layer packet according to an exemplary embodiment. FIG. 4A shows a conventional Ethernet packet 410, FIG. 4B shows a conventional 802.11-IP packet 420, and FIG. 4C shows an 802.11-AVTL packet 430 including an AVTL packet 431 obtained by the data encapsulation 311 illustrated in FIG. 3, according to an exemplary embodiment.

Referring to FIG. 4A, the conventional Ethernet packet 410 includes a Media Access Control (MAC) header 411, a payload 415, and a Frame Check Sequence (FCS) 416.

The MAC header 411 includes fields such as a destination MAC address 412, a source MAC address 413, and a packet type 414. The payload 415 includes an IP packet or an Address Resolution Protocol (ARP) packet. The FCS 416 includes a 32-bit Cyclic Redundancy Check (CRC) sequence for error detection and correction. If the packet type 414 has a value 0x0800, the payload 415 may include an IP packet. On the other hand, if the packet type 414 has a value 0x0806, the payload 415 may include an ARP packet.

Referring to FIG. 4B, the conventional 802.11-IP packet 420 includes an 802.11 MAC header 421, which is the header of a MAC sublayer, an 802.2 Logical Link Control (LLC)/Subnetwork Access Protocol (SNAP) header 422, which is the header of an LLC sublayer, a payload 424, and an FCS 425 including a 32-bit CRC sequence. If a Type field 423 of the 802.2 LLC/SNAP header 422 has a value 0x0800, the payload 424 may include an IP packet. On the other hand, if the Type field 423 has a value 0x0806, the payload 424 may include an ARP packet. The values allocated to the Type field 423 are listed in the document RFC1700, wherein RFC stands for Request for Comments.

Referring to FIG. 4C, the 802.11—AVTL packet 430 according to an exemplary embodiment may include the AVTL packet 431 instead of an IP-based packet, in a payload 424. The AVTL packet 431 may include an AVTL header 432 and may include an AVTL payload 433. If information included in the AVTL payload 433 is data, the AVTL packet 431 may be considered a data packet. If the information included in the AVTL payload 433 is control information, the AVTL packet 431 may be considered a control packet.

A Type field 423 of an 802.2 LLC/SNAP header 422 of FIG. 4C may indicate the AVTL packet 431 included in the payload 424 is a data packet or a control packet. If the Type field 423 has a value 0xXXXX, the AVTL packet 431 included in the payload 424 may be an AVTL data packet. If the Type field 423 has a value 0xYYYY, the AVTL packet 431 included in the payload 424 may be an AVTL control packet. The values 0xXXXX and 0xYYYY may be suitably predetermined by one of ordinary skill in the art.

Accordingly, according to an exemplary embodiment, a data packet and a control packet may be distinguished from each other by analyzing a header of a data link layer. As needed, a data packet and a control packet may, according to an aspect of the exemplary embodiment, be processed according to different procedures. As shown in FIG. 3, the data path 301 and the control path 302 may be distinguished from each other in a layer equal to or higher than the AVTL layer.

Since a data packet may require a large number of calculations to process, a data packet according to an aspect of an exemplary embodiment may be processed using hardware, and this may reduce latency that occurs during data processing. A control packet may require a small number of calculations to process, but varied messages may need to be processed. Accordingly, a control packet according to an aspect of an exemplary embodiment may be processed using software instead of using hardware. Therefore, according to an exemplary embodiment, after data packets and control packets are distinguished from each other by analyzing a header in the data link layer, the data packets and the control packets may be processed using hardware and software, respectively. Thus, latency may be reduced, and packets may be efficiently processed.

FIGS. 5A and 5B show an AVTL data packet 500 according to an exemplary embodiment. FIG. 5A shows an exemplary format of an AVTL data packet 500, and FIG. 5B is a table showing exemplary descriptions of fields illustrated in FIG. 5A. The marks 0-31 of FIG. 5A represent bit fields, with bytes designated by thicker marks.

Referring to FIG. 5A, an AVTL data packet 500 according to the present exemplary embodiment may include a header 501, having a 6-byte length, and a payload 502, having a variable length. The header 501 may include a Version field 503, a Stream ID field 504, a Time Stamp Flag field (T) 505, a Reserved field 506, a Source Packet Type field 507, a Num of Source Packets field 508, a Reserved field 509, and a Sequence Number field 510.

Referring to FIG. 5B, the Version field 503 having a 2-bit length may indicate a version of the AVTL data packet 500, and the Stream ID field 504 having a 5-bit length may indicate an identifier (ID) of an AV stream.

The Time Stamp Flag field 505 having a 1-bit length may indicate whether time stamps have been inserted into a source packet of the payload 502. The time stamps may be used for jitter control of a link, timing control of AV data, or other processes.

Figure 6A:
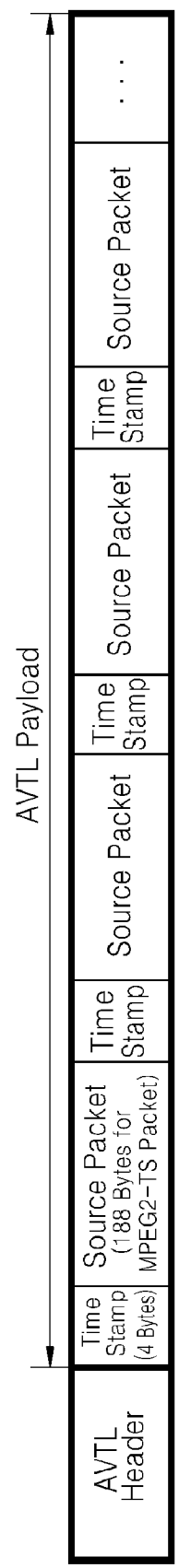
FIGS. 6A and 6B show exemplary methods of inserting time stamps into an AVTL packet, according to exemplary embodiments.
Figure 6B:
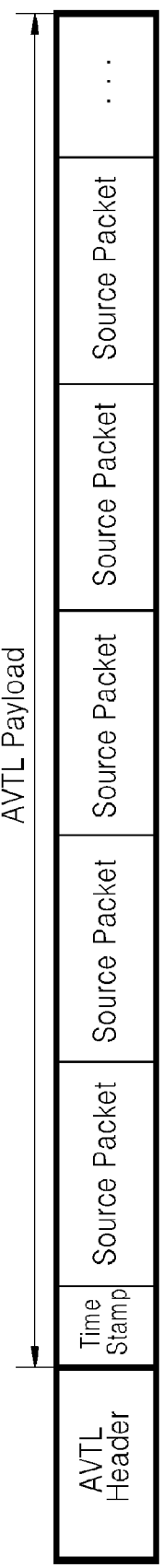

FIGS. 6A and 6B show exemplary methods of inserting time stamps into the AVTL data packet 500, according to aspects of exemplary embodiments. Referring to FIG. 5A, for example, if the Time Stamp Flag field 505 has a value of 1, a time stamp having a 4-byte length may be added to each of source packets, as illustrated in FIG. 6A. If the Time Stamp Flag field 505 has a value of 0, no time stamps may be added. In some exemplary embodiments, 2 bits may be allocated to the Time Stamp Flag field 505 of FIG. 5A by using one bit of the Reserved field 506 having the 4-bit length. In such a 2 bit Time Stamp Flag Field, if the Time Stamp Flag field 505 has a value of 2, a single time stamp may be added for all source packets, as illustrated in FIG. 6B.

The Source Packet Type field 507 of FIG. 5A may have a 4-bit length and may indicate a type of source packet. If, for example, the value of the Source Packet Type field 507 is 0, the source packet may be an MPEG2-TS packet having a 188-byte length, and if the value of the Source Packet Type field 507 is from 1 to 15, various other types of source packet may be indicated. The Num of Source Packets field 508 of FIG. 5A may have an 8-bit length and may indicate a number of source packets included in the payload 502. The Sequence Number field 510 may have a 16-bit length and may be a number that increments by 1 if an AVTL data packet 500 is transmitted.

The payload 502 of the AVTL data packet 500 may include source packets, a plurality of time stamps, and a single time stamp, as illustrated in FIGS. 6A and 6B.

FIGS. 7A and 7B show an AVTL control packet 700 according to an exemplary embodiment. FIG. 7A shows an exemplary format of an AVTL control packet 700, and FIG. 7B shows a table of exemplary descriptions of fields illustrated in FIG. 7A. The marks 0-31 of FIG. 7A represent bit fields, with byte boundaries designated by thicker marks.

Referring to FIG. 7A, the AVTL control packet 700 according to the present exemplary embodiment may include a header 701 having a 4-byte length and a payload 702 having a variable length. The header 701 may include a Version field 703, a Function Type field 704, a Reserved field 705, a Sequence Number field 706, and a Length field 707. The payload 702 may include an OP Code (Operation Code) 708 and an Operand 709.

Referring to FIG. 7B, the Version field 703 having a 2-bit length may represent the version of the ATVL control packet 700, and the Function Type field 704 having a 4-bit length may represent the function type of a control message included in the payload 702. If, for example, the Version field 703 has a value of 0, the function type of the control message may be the CP control 313. If the Version field 703 has a value of 1, the function type of the control message may be the AV capability exchange 312. If the Version field 703 has a value of 2, the function type of the control message may be the connection management 314. If the value of the Version field 703 is a number from 3 to 15, the function type of the control message may be any of various function types, such as device control.

The Sequence Number field 706 having an 8-bit length may represent a number that increments by 1 if an AVTL control packet 700 is transmitted. The Length field 707 having a 16-bit length may represent the length of the payload 702 in bytes.

The OP Code field 708 having an 8-bit length may represent the type of an AVTL control message, and the Operand field 709 may include an AVTL control command or response message.

FIG. 8 is a table showing exemplary AVTL control messages that may be included in the payload 702 of the AVTL control packet 700.

Referring to FIG. 8, columns S and D indicate messages associated with the CP control 313 transmitted by an AV data transmitting side (i.e., an AV source), and messages associated with the CP control 313 transmitted by an AV data receiving side (i.e., an AV destination), respectively. Examples of messages associated with the CP control 313 include a CP_CONTROL_COMMAND message for transmitting a CP command and a CP_CONTROL_RESPONSE message as a response corresponding to the CP_CONTROL_COMMAND message. Through these messages, HDCP2-IIA Authentication Key Exchange (AKE) messages may be exchanged.

Examples of messages associated with the AV capability exchange 312 include an AV_PROBE_REQUEST message for requesting information about the capability of an AV apparatus and an AV_PROBE_RESPONSE message as a response corresponding to the AV_PROBE_REQUEST message. Using these messages, device AV information blocks such as AV_GENERAL_INFO_IB representing the type of an AV apparatus, a video codec, an audio codec, or the like, SUPPORTED_VIDEO_FORMAT_IB representing a video resolution or the like, and SUPPORTED_AUDIO_FORMAT_IB representing an audio format or the like may be exchanged.

Examples of messages associated with the connection management 314 include a CONNECTION_SETUP_REQUEST message for requesting connection setup, a CONNECTION_SETUP_RESPONSE message as a response corresponding to the CONNECTION_SETUP_REQUEST message, a CONNECTION_BREAK_NOTIFY message for notifying a connection break, a STREAM_START_NOTIFY message for notifying the start of stream transmission, an ERROR_FEEDBACK_NOTIFY message for notifying the occurrence of an error, such as picture loss, slice loss, or the like, an AV_ADAPTATION_REQUEST message for requesting a change of a connection status, and an AV_ADAPTATION_RESPONSE message as a response corresponding to the AV_ADAPTATION_REQUEST message. The STREAM_START_NOTIFY message and the AV_ADAPTATION_RESPONSE message from among the above-listed messages may be transmitted by the AV data transmitting side, the ERROR_FEEDBACK_NOTIFY message and AV_ADAPTATION_REQUEST message may be transmitted by the AV data receiving side, and the remaining messages may be transmitted by either the AV data transmitting side or the AV data receiving side.

As described above, when a simple AVTL packet according to an aspect of an exemplary embodiment is used, packets may be more rapidly and more efficiently processed than when a conventional IP packet is used. Thus, latency in data processing may be reduced.

Figure 9:
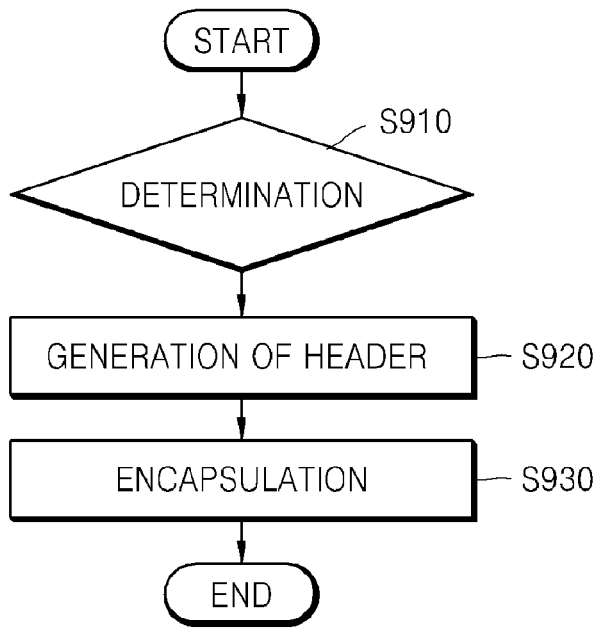
FIG. 9 is a flowchart of a packet producing method according to an exemplary embodiment.
Figure 11:
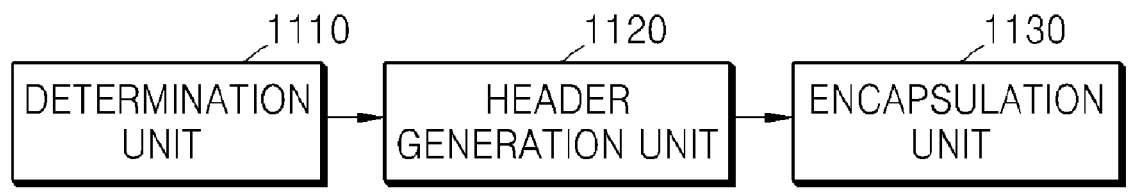
FIG. 11 is a block diagram of a packet producing apparatus according to an exemplary embodiment.

FIG. 9 is a flowchart of a packet producing method according to an exemplary embodiment. FIG. 11 is a block diagram of a packet producing apparatus according to an exemplary embodiment. For convenience of explanation, the packet producing method and the packet producing apparatus will now be described together.

Referring to FIGS. 9 and 11, the packet producing apparatus according to the present exemplary embodiment may include a determination unit 1110, a header generation unit 1120, and an encapsulation unit 1130. In operation 5910, the determination unit 1110 determines whether information to be transmitted is data or control information. In operation 5920, the header generation unit 1120 generates a data link layer packet header which may include information used to distinguish a data packet from a control packet according to a result of the determination. In operation 5930, the encapsulation unit 1130 encapsulates the information to be transmitted by using the data link layer packet header, thereby producing a data link layer packet.

Figure 10:
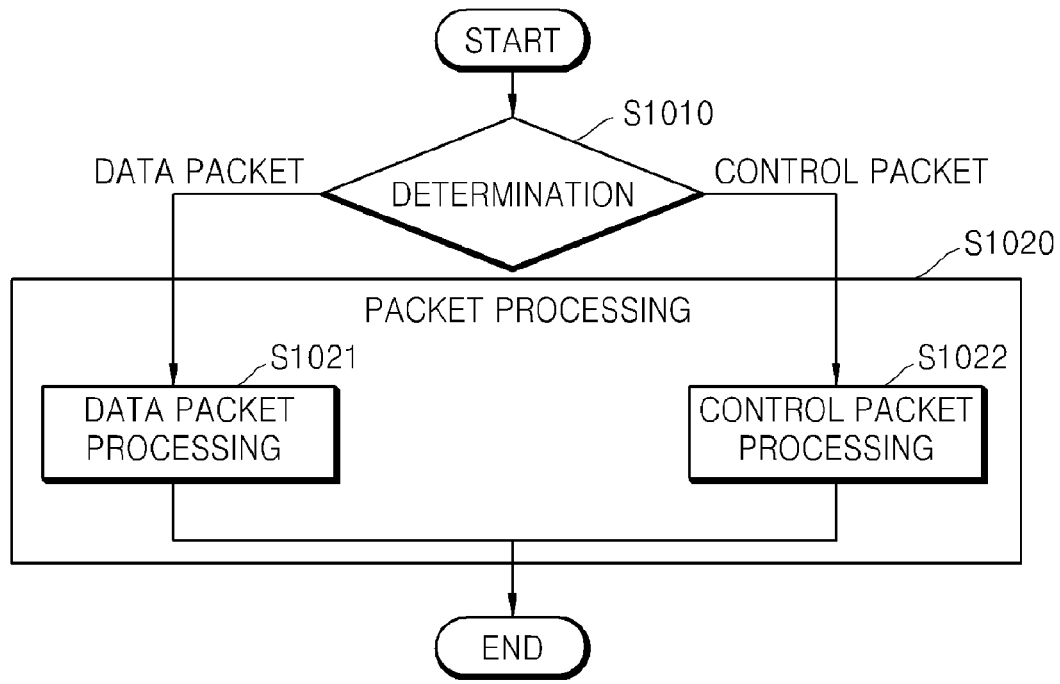
FIG. 10 is a flowchart of a packet processing method according to an exemplary embodiment.
Figure 12:
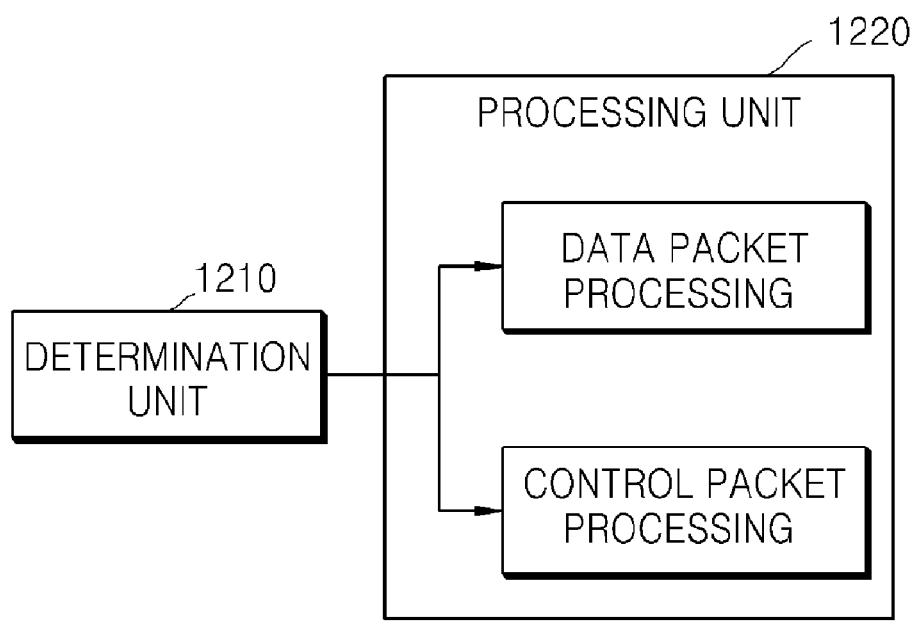
FIG. 12 is a block diagram of a packet processing apparatus according to an exemplary embodiment.

FIG. 10 is a flowchart of a packet processing method according to an exemplary embodiment. FIG. 12 is a block diagram of a packet processing apparatus according to an exemplary embodiment. For convenience of explanation, the packet processing method and the packet processing apparatus will now be described together.

Referring to FIGS. 10 and 12, the packet processing apparatus according to the present exemplary embodiment includes a determination unit 1210 and a processing unit 1220. In operation S1010, the determination unit 1210 determines whether an upper layer packet included in the payload of the data link layer packet is a data packet or a control packet, by analyzing the header of the data link layer packet. In operation, S1020, the processing unit 1220 processes the data packet and the control packet according to separate procedures.

If, for example, the upper layer packet is a data packet, the processing unit 1220 may process the data packet using hardware, in operation S1021. If the upper layer packet is a control packet, the processing unit 1220 may process the control packet using software, in operation S1022.

According to aspects of exemplary embodiments, protocols are used during AV data transmission, whereby AV data can be efficiently transmitted and a data packet and a control packet can be distinguished from each other in a data link layer, and a data packet may be processed using hardware, leading to high-speed processing.

Aspects of exemplary embodiments may also be embodied as computer readable codes embodied on a tangible computer readable recording medium. The computer readable recording medium may be a tangible data storage device that can store data that can be thereafter read by a general-purpose computer or a specifically devised and adapted machine. Non-limiting examples of computer readable recording media include read-only memory (ROM), non-volatile random-access memory (RAM), CD-ROMs, magnetic tapes, hard disks, floppy disks, optical data storage devices, and others While aspects of exemplary embodiments have been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense and not for purposes of limitation. Therefore, the scope of the invention is defined not by the detailed description of the invention but by the appended claims. Additionally, expressions such as "at least one of", when preceding a list of elements, modify the entire list of elements and do not modify each element of the list.

What is claimed is:

1. A packet producing method comprising:
   determining, using a determination unit, whether information to be transmitted comprises data or control information;
   generating, using a header generation unit, a data link layer packet header comprising information used to distinguish a data packet from a control packet, according to the determining; and
   encapsulating, using an encapsulation unit, the information to be transmitted by using the data link layer packet header,
   wherein the encapsulating of the information to be transmitted comprises encapsulating the information to be transmitted by using the data link layer packet header to produce an upper layer packet of a data link layer packet payload, and encapsulating the upper layer packet of the data link layer packet payload by using the data link layer packet header,
   wherein if the information to be transmitted comprises data, one or more source packets are allocated to a payload of the upper layer packet, and
   wherein one or more time stamps are inserted into the payload of the upper layer packet such that the one or more time stamps are respectively allocated to the one or more source packets, or wherein a single time stamp is inserted into the payload of the upper layer packet for all of the one or more source packets.

2. The packet producing method of claim 1, wherein the information used to distinguish the data packet from the control packet is included in a type field of an 802.2 Logical Link Control (LLC)/Subnetwork Access Protocol (SNAP) header of the data link layer packet header.

3. The packet producing method of claim 1, wherein the upper layer packet header comprises at least one of a stream identifier (ID), a time stamp flag, a source packet type, a number of the one or more source packets, and a packet number.

4. The packet producing method of claim 1, wherein, if the information to be transmitted comprises control information, the upper layer packet header comprises at least one of a message type, a packet number, a payload length, and a message code,
   wherein the message type comprises one of a contents protection control, an audio/video (AV) capability exchange, and a connection management.

5. The packet producing method of claim 4, wherein:
   if the message type comprises the contents protection control, the information to be transmitted comprises a contents protection command message or a contents protection response message;
   if the message type comprises the AV capability exchange, the information to be transmitted comprises an AV probe request message or an AV probe response message; and
   if the message type comprises the connection management, the information to be transmitted comprises one of a connection setup request message, a connection setup response message, a connection break notification message, a stream start notification message, an error feedback notification message, an AV adaptation request message, and an AV adaptation response message.

6. A packet processing method comprising:
   determining, using a determination unit, whether an upper layer packet included in a payload of a data link layer packet is a data packet or a control packet, by analyzing the upper layer packet of the data link layer packet; and
   processing, using a processing unit, the upper layer packet according to separate procedures according to the determining,
   wherein, if the upper layer packet is the data packet, one or more source packets are included in a payload of the upper layer packet, and
   wherein one or more time stamps are inserted into the payload of the upper layer packet such that the one or more time stamps are respectively allocated to the one or more source packets, or wherein a single time stamp is inserted into the payload of the upper layer packet for all of the one or more source packets.

7. The packet processing method of claim 6, wherein:
   if the upper layer packet is the data packet, processing the data packet using hardware; and
   if the upper layer packet is the control packet, processing the control packet using software.

8. The packet processing method of claim 6, wherein the determining whether the upper layer packet is the data packet or the control packet is performed by referring to a type field of an 802.2 Logical Link Control (LLC)/Subnetwork Access Protocol (SNAP) header of the data link layer packet header.

9. The packet processing method of claim 6, wherein the upper layer packet header comprises at least one of a stream identifier (ID), a time stamp flag, a source packet type, the number of the one or more source packets, and a packet number.

10. The packet processing method of claim 6, wherein, if the upper layer packet is the control packet, the upper layer packet header comprises at least one of a message type, a packet number, a payload length, and a message code, wherein the message type comprises one of a contents protection control, an audio/video (AV) capability exchange, and a connection management.

11. The packet processing method of claim 10, wherein:
    if the message type comprises the contents protection control, the information to be transmitted comprises a contents protection command message or a contents protection response message;
    if the message type comprises the AV capability exchange, the information to be transmitted comprises an AV probe request message or an AV probe response message; and
    if the message type comprises the connection management, the information to be transmitted comprises one of a connection setup request message, a connection setup response message, a connection break notification message, a stream start notification message, an error feedback notification message, an AV adaptation request message, and an AV adaptation response message.

12. A packet producing apparatus comprising:
    a determination unit which determines whether information to be transmitted is data or control information;
    a header generation unit which generates a data link layer packet header comprising information used to distinguish a data packet from a control packet according to the determination; and
    an encapsulation unit which encapsulates the information to be transmitted by using the data link layer packet header,
    wherein the encapsulation unit encapsulates the information to be transmitted by using the data link layer packet header to produce an upper layer packet of a data link layer packet payload, and encapsulates the upper layer packet of the data link layer packet payload by using the data link layer packet header, wherein, if the upper layer packet is the data packet, one or more source packets are included in a payload of the upper layer packet, and wherein one or more time stamps are inserted into the payload of the upper layer packet such that the one or more time stamps are respectively allocated to the one or more source packets, or wherein a single time stamp is inserted into the payload of the upper layer packet for all of the one or more source packets.

13. The packet producing apparatus of claim 12, wherein, if the information to be transmitted is the data, one or more source packets are allocated to a payload of the upper layer packet.

14. The packet producing apparatus of claim 13, wherein one or more time stamps are inserted into the payload of the upper layer packet such that the one or more time stamps are respectively allocated to the one or more source packets, or wherein a single time stamp is inserted into the payload of the upper layer packet for all of the one or more source packets.

15. The packet producing apparatus of claim 12, wherein, if the information to be transmitted comprises control information, the upper layer packet header comprises at least one of a message type, a packet number, a payload length, and a message code, wherein the message type comprises one of a contents protection control, an audio/video (AV) capability exchange, and a connection management.

16. A packet processing apparatus comprising:
a determination unit which determines whether an upper layer packet included in a payload of a data link layer packet is a data packet or a control packet, by analyzing the upper layer packet of the data link layer packet; and
a processing unit which processes the upper layer packet according to separate procedures, according to the determination,
wherein, if the upper layer packet is the data packet, one or more source packets are included in a payload of the upper layer packet, and
wherein one or more time stamps are inserted into the payload of the upper layer packet such that the one or more time stamps are respectively allocated to the one or more source packets, or wherein a single time stamp is inserted into the payload of the upper layer packet for all of the one or more source packets.

17. The packet processing apparatus of claim 16, wherein:
if the upper layer packet is the data packet, the processing unit processes the data packet using hardware; and
if the upper layer packet is the control packet, the processing unit processes the control packet using software.

18. The packet processing apparatus of claim 16, wherein, if the upper layer packet is the control packet, the upper layer packet header comprises at least one of a message type, a packet number, a payload length, and a message code, wherein the message type comprises one of a contents protection control, an audio/video (AV) capability exchange, and a connection management.

19. A packet transmission system comprising:
a transmitter which transmits a data link layer packet that comprises information distinguishing a data packet from a control packet in an upper layer packet of the data link layer packet; and
a receiver which receives the data link layer packet and determines whether the upper layer packet included in a payload of the data link layer packet is a data packet or a control packet by analyzing the upper layer packet of the data link layer packet, and processes the upper layer packet according to different procedures according to the determination, wherein, if the upper layer packet is the data packet, one or more source packets are included in a payload of the upper layer packet, and wherein one or more time stamps are inserted into the payload of the upper layer packet such that the one or more time stamps are respectively allocated to the one or more source packets, or wherein a single time stamp is inserted into the payload of the upper layer packet for all of the one or more source packets.

20. The packet transmission system of claim 19, wherein the transmitter transmits the data link layer packet wirelessly, and wherein the receiver comprises a display.

21. A non-transitory computer readable recording medium having recorded thereon a computer program for executing the method of:
determining whether information to be transmitted comprises data or control information;
generating a data link layer packet header comprising information used to distinguish a data packet from a control packet, according to the determining; and
encapsulating the information to be transmitted by using the data link layer packet header,
wherein the encapsulating of the information to be transmitted comprises encapsulating the information to be transmitted by using the data link layer packet header to produce an upper layer packet of a data link layer packet payload, and encapsulating the upper layer packet of the data link layer packet payload by using the data link layer packet header,
wherein, if the upper layer packet is the data packet, one or more source packets are included in a payload of the upper layer packet, and
wherein one or more time stamps are inserted into the payload of the upper layer packet such that the one or more time stamps are respectively allocated to the one or more source packets, or wherein a single time stamp is inserted into the payload of the upper layer packet for all of the one or more source packets.

22. A packet based transmitting and receiving system, the system comprising:
a packet transmitting unit comprising:
a determination unit which determines if information to be transmitted is data information or control information,
a header generation unit which generates a link layer packet header comprising information which distinguishes data information from control information, according to the determination,
an encapsulation unit which encapsulates the information to be transmitted by using the link layer packet header and thereby produces an upper layer packet of a data link layer packet payload, and
a transmitting unit which transmits the upper layer packet of the data link layer packet payload; and
a packet receiving unit comprising:
a receiving unit which receives the upper layer packet of the data link layer packet payload transmitted by the transmitting unit,
a packet type determination unit which analyses the information which distinguishes data information from control information,
a processing unit which processes the link layer packet according to a first procedure or a second procedure, according to analysis,
wherein, if the upper layer packet is the data packet, one or more source packets are included in a payload of the upper layer packet, and wherein one or more time stamps are inserted into the payload of the upper layer packet such that the one or more time stamps are respectively allocated to the one or more source packets, or wherein a single time stamp is inserted into the payload of the upper layer packet for all of the one or more source packets.

23. The packet based transmitting and receiving system of claim 22, wherein the first procedure processes using hardware, and the second procedure processes using software.

24. The packet based transmitting and receiving system of claim 23, wherein the processing unit processes a received link layer packet comprising data information using the first procedure, and a received link layer packet comprising control information using the second procedure.

25. A non-transitory computer readable recording medium having recorded thereon a computer program for executing the method of:

determining whether an upper layer packet included in a payload of a data link layer packet is a data packet or a control packet, by analyzing the upper layer packet of the data link layer packet; and processing the upper layer packet according to separate procedures according to the determining, wherein, if the upper layer packet is the data packet, one or more source packets are included in a payload of the upper layer packet, and wherein one or more time stamps are inserted into the payload of the upper layer packet such that the one or more time stamps are respectively allocated to the one or more source packets, or wherein a single time stamp is inserted into the payload of the upper layer packet for all of the one or more source packets.

* * * * *